United States Patent Office 2,719,010
Patented Sept. 27, 1955

2,719,010

PROCESS OF PREPARING FINELY DIVIDED PRODUCTS FROM INORGANIC RELATIVELY POROUS PLASTIC MATERIAL

Henry Erickson, Calumet City, Ill., assignor to Sinclair Refining Company, New York, N. Y., a corporation of Maine No Drawing. Application May 19, 1950,
Serial No. 163,097

2 Claims. (Cl. 241—17)

My invention relates to a method for preparing inorganic materials in finely-divided form. More particularly, the present invention resides in reducing relatively porous inorganic materials, such as various metal oxides or gels thereof and natural clays, into particle or powder form by washing the inorganic material in an aqueous medium containing a small amount of a surface active agent, removing the free water, drying the washed material at elevated temperatures to remove any residual water, and fragmenting the dried material.

Finely-divided inorganic particles have a considerable number of important applications. For example, powdered metal oxides, such as alumina, silica and titania, may be used as fillers or finishing materials in compounding rubber, as pigments for paints and as catalysts or catalyst supports in hydrocarbon conversion reactions. Finely-divided clays, such as powdered bentonite, are of value in grease compositions to replace graphite and other more expensive constitutents often employed in such lubricants, as disclosed in my copending application Serial No. 225,911, filed May 11, 1951.

These powders or finely-divided particles are prepared from relatively porous, plastic inorganic materials. However, although the starting material is relatively porous, only a minor proportion of the total volume of the solid is made up of void spaces. This is due in large part to the conventional method of preparing the materials for use which involves washing in an aqueous medium, followed by drying at elevated temperatures to a low water content. As a result of washing and drying, pronounced shrinkage of the porous structure results. This shrinkage is believed to be due to the effects of the surface tension of the water contained within the porous material as water of hydration or as loosely bound water manifested during evaporation of the liquid in drying. In any event, the general effect is to reduce rather than increase porosity.

However, the higher the porosity of such inorganic materials, the easier it is to fragment or finely divide. That is, highly porous materials are usually much more friable because of their structure. As a result, it is not necessary to resort to super-fragmentation in order to readily reduce highly porous materials into most any desired state of subdivision. Accordingly, it has already been proposed to prepare more porous, friable inorganic materials which will be susceptible to simple fragmentation. For instance, one method involves preparation of an aerogel. Aerogels are prepared by alcohol exchange for water in the fully hydrated gel followed by removal of the alcohol medium above its critical pressure. Or porosity may be increased by subjecting the porous plastic material to the high pressure of an inert gas in an enclosed vessel, whereupon the high pressure is suddenly released. This results in "popping" the plastic material to an improved degree of porosity. Unfortunately, techniques such as these are not particularly attractive cost-wise because of the expensive equipment and complicated procedure involved. In fact, they are especially unattractive when low cost sources of these powders are desired.

I have found a simple and efficient method for reducing inorganic materials to finely divided form. Essentially, I add a small amount of a surface active agent to the aqueous medium in which the materials are washed. Where a number of washing operations are conducted the surface active agent is advantageously added only to the final wash liquor. The free water is removed, the inorganic material dried at elevated temperatures to remove any residual water, and the dried material fragmented into particles of any desired size range. I have found that the addition of a surface active agent to the wash solution prevents the usual degree of shrinkage during subsequent drying, so as to result in the formation of intermediate inorganic materials of high porosity which are especially friable. By surface active agents, I mean agents whose molecules contain both a hydrophobic and a hydrophilic portion, such as a soap or a detergent, which by reason of this molecular structure function to reduce surface or interfacial tension when dissolved in water.

My invention is adapted to the preparation of finely divided particles or powders from relatively porous inorganic materials. Naturally-occurring clays, such as montmorillonite, fuller's earth, bentonite, kaolin and atalpo, are exemplary of such starting materials. Various metal oxides, such as silica, alumina and titania, are other examples of useful materials. Diatomaceous earth or clay-like minerals such as bauxite may also be treated. Although these materials may be of natural origin, they may also be synthetically prepared as from hydrated gels or gel forming substances. For instance, silica gel is prepared by the reaction of water glass with acid, by co-precipitation or gelation of a soluble silicate and a salt from aqueous solution, or by digestion or reaction of hydrated silica and a salt in aqueous slurry, followed by removal of the water. The materials may be made up of several substances, as from mixed gels or by impregnation of a clay or gel with metal oxides, etc.

In applying the principles of my invention, a wide variety of surface active agents may be used in reducing the contraction of the inorganic material pore size during drying. As exemplary, there are the alkyl, aryl sulfonates and sulfonic acids, sulfonated alkyl succinates, sulfated fatty alcohols, fatty esters of polyhydroxy alcohols, condensations of ethylene oxide with fatty acids, and the like. I consider that substances typical of the known surface active agents and detergents are generally useful since they are ordinarily characterized by sufficient water solubility and capacity for reducing the surface or interfacial tensions of water. Detergents of the anionic and non-ionic type are particularly useful. Cationic detergents such as the quaternary ammonium compounds are also useful but are limited at present in practical utility by relatively high cost. A classification and description of useful surface active agents of the type contemplated for my invention may be found in a report of John W. McCutcheon in "Chemical Industries," volume 61; 811 to 822, November 1947. In addition to the commoner soaps, the ammonium soaps of higher fatty acids, e. g. ammonium laurate, and the ammonium soaps of mixed fatty acids derived by oxidation of waxes, are valuable in the process of my invention.

Comparatively, the bivalent metal sulfonate salts appear to be more effective in reducing surface tension than the monovalent salts. The use of electrolytes in the treating solutions, particularly ammonium sulfate or magnesium sulfate appears to produce a synergistic effect reducing the amount of agent required.

The average pore radius of the inorganic materials treated appears to be a function of the surface tension of the evaporating liquid in the drying step. I have found that the reduction in contraction may be controlled by regulating the surface tension of the liquid present in the inorganic material during drying. The desired surface tension may be regulated by choice of the surface active agent so as to select an agent having relatively satisfactory capacity for reducing surface or interfacial tension of water. The surface tension is also regulated by varying the amount of the agent which is added. The surface tension of pure water is 72 dynes/cm.² and the effect of the varying concentrations of surface active agents in reducing the surface tension of water is a commonly reported physical property of known agents but in any event is readily determined.

Usually only a small amount of the surface active agent is required. However, sufficient amounts of the agent should be added to the wash solution in order to obtain a maximum reduction in surface tension. In this way, the solid material prepared has the greatest degree of porosity possible. Concentration in each instance will depend upon the nature of the surface active agent employed and the inorganic material being treated. I have found that it is usually necessary to add at least about one per cent of the agent based on the weight of the inorganic material. Amounts up to 7 to 8 per cent and even higher may be warranted in some cases to prepare solids of maximum porosity. Often it is more convenient to add the agent as a given concentration in water solution without direct reference to the weight of solids treated. Sufficient water is used to obtain a completely fluid mix in which case the weight of the water amounts to about 15 times the solids weight. For example, in treating a water slurry of a hydrogel where the hydrogel filter cake ordinarily would amount to 5 to 18 per cent solids and 95 to 82 per cent water, I add a 0.1 per cent to about 0.5 per cent, and higher, water solution of the surface active agent to the dispersion of the hydrogel. The mixture is thoroughly agitated in order to assure uniform adsorption and penetration before drying. However, unnecessarily large concentrations of the agent are undesirable because the agent is wasted through undue adsorption.

As I visualize the effect of the surface active agent in the drying step of my process, it functions to reduce the constrictive effect of the liquid water evaporating from the capillaries of the inorganic material. In my opinion, two mechanisms are possible. The agent may reduce the surface tension of the liquid-air interface and so reduce the constrictive effects acting to collapse the pores during evaporation. It is also probable that some adsorption of the surface active agent onto the walls of the capillary occurs. In this event, the polar end of the molecule would be adsorbed and the opposite hydrocarbon or hydrophobic end would act to repel the water and thus to reduce the force acting to contract the pore diameter.

Advantageously, where a number of washing operations are conducted the surface active agent is only added to the final wash liquid. After washing the inorganic material in the aqueous medium containing the surface active agent, the free water is removed. This is accomplished by draining off the excess water, removing the water by suction, by filtration or any other suitable means. The inorganic material is then dried at elevated temperatures to remove any residual water present. Temperatures in the range approximating 300° to 1000° F. are usually satisfactory for this purpose, for a period of several hours or more. The extent to which it is desired to remove the water present will determine the drying conditions. Generally, a fully dehydrated material is more susceptible to fragmentation than one containing even small amounts of residual water, so it is usually advantageous to dehydrate fully.

The porous inorganic material is then reduced into the desired state of subdivision. This may be accomplished by simple grinding and depends upon the composition involved, its porosity and the degree of subdivision desired. Usually, the inorganic material is ground into small particles that will pass through at least a 20-mesh screen. However, considerable finer particles are easily prepared. The fine particles so produced may be screened for separation into similar size ranges, in the usual manner.

Finely-divided metal oxides are useful as pigments in paints and as fillers in rubber. Mixtures thereof may be employed as catalysts in hydrocarbon conversion reactions. Finely-divided clay-like minerals, such as diatomaceous earth, provide catalyst supports in similar reactions. As I have disclosed in my copending application Serial No. 225,911, referred to above, powdered bentonite may be added to grease compositions. The lamellar structure of the bentonite particles appear to be similar to that of graphite and molybdenite. As a result, the bentonite particles increase the lubricating characteristics of the grease and do not effect an undesirable abrasive action. In any event, in each instance of application, the individual particle size may be easily adjusted for the desired use, as well as a suitable inorganic material selected for treatment.

I claim:

1. The method of preparing finely-divided particles which comprises treating an inorganic relatively porous plastic material with a water solution containing a small amount of a surface active agent containing both a hydrophobic portion and a hydrophilic portion, removing the free water, drying the washed material at elevated temperatures to remove any residual water, and fragmenting the dried material.

2. The method according to claim 1 in which the surface-active agent is an alkyl aryl sulfonate.

References Cited in the file of this patent

UNITED STATES PATENTS

| | | |
|---|---|---|
| 2,093,454 | Kistler | Sept. 21, 1937 |
| 2,284,248 | Baker | May 26, 1942 |
| 2,341,994 | Kingsbury et al. | Feb. 15, 1944 |
| 2,386,337 | Moyer | Oct. 6, 1945 |
| 2,435,158 | Read | Jan. 27, 1948 |
| 2,475,253 | Pierce | July 5, 1949 |
| 2,490,260 | Ehrhardt | Dec. 6, 1949 |
| 2,491,051 | McCarter | Dec. 13, 1949 |
| 2,532,497 | Hoekstra | Dec. 5, 1950 |
| 2,643,231 | Erickson | June 23, 1953 |